US009237252B2

(12) United States Patent
Verhaegh (10) Patent No.: US 9,237,252 B2
(45) Date of Patent: Jan. 12, 2016

(54) SIGNAL INTENSITY MATCHING OF IMAGE SENSORS

(75) Inventor: Gerard Verhaegh, Hillerød (DK)

(73) Assignee: Contex A/S, Allerod (DK)

( * ) Notice: Subject to any disclaimer, the term of this patent is extended or adjusted under 35 U.S.C. 154(b) by 24 days.

(21) Appl. No.: 13/877,328

(22) PCT Filed: Oct. 1, 2010

(86) PCT No.: PCT/EP2010/064656
§ 371 (c)(1),
(2), (4) Date: Jun. 10, 2013

(87) PCT Pub. No.: WO2012/041390
PCT Pub. Date: Apr. 5, 2012

(65) Prior Publication Data
US 2013/0286451 A1 Oct. 31, 2013

(51) Int. Cl.
| | | |
|---|---|---|
| *G03F 3/08* | (2006.01) | |
| *H04N 1/38* | (2006.01) | |
| *H04N 1/409* | (2006.01) | |
| *B41C 1/04* | (2006.01) | |
| *H04N 1/387* | (2006.01) | |
| *H04N 1/193* | (2006.01) | |
| *H04N 1/19* | (2006.01) | |

(52) U.S. Cl.
CPC ............ *H04N 1/193* (2013.01); *H04N 1/1903* (2013.01); *H04N 1/1933* (2013.01); *H04N 1/1934* (2013.01)

(58) Field of Classification Search
CPC ............... H04N 1/21; H04N 1/23; G03F 3/03
USPC ........ 396/429; 345/629; 348/352, 222.1, 474, 348/294; 399/51, 49
See application file for complete search history.

(56) References Cited

U.S. PATENT DOCUMENTS

| | | | | |
|---|---|---|---|---|
| 7,796,902 B2 * | 9/2010 | Watanabe | .......... | G03G 15/5037 399/46 |
| 2002/0044779 A1 * | 4/2002 | Shiomi | ................ | H04N 5/2176 396/429 |

(Continued)

FOREIGN PATENT DOCUMENTS

| | | |
|---|---|---|
| JP | 2002-142158 A | 5/2002 |
| JP | 2005-79816 A | 3/2005 |
| JP | 2012-4866 A | 1/2012 |

OTHER PUBLICATIONS

International Search Report received for PCT Patent Application No. PCT/EP2010/064656, mailed on Mar. 1, 2011, 3 pages.

*Primary Examiner* — Akwasi M Sarpong
(74) *Attorney, Agent, or Firm* — Morrison & Foerster LLP (57) ABSTRACT

Disclosed is a method of processing signals from a large-format scanner comprising a first and a second image sensor that provide respective image signals recorded at respective areas of a scanned medium, where a portion of the respective areas is recorded also by the other of the respective image sensors, whereby image data from overlapping and non-overlapping areas are present in the respective signals; the method comprising: determining a first and a second level of intensity from image signals from the first and the second image sensor at the overlapping area, respectively; determining a compensation value by processing the first level of intensity and the second level of intensity to determine a discrepancy between the level of intensities; applying compensation values to image data from overlapping and non-overlapping areas to provide compensated image data to compensate for a discrepancy between levels of intensity from the first and the second image sensor.

14 Claims, 5 Drawing Sheets

(56) References Cited

U.S. PATENT DOCUMENTS

| | | | |
|---|---|---|---|
| 2005/0057577 A1* | 3/2005 | Kuwabara | H04N 1/3876 345/629 |
| 2006/0238831 A1* | 10/2006 | Kim | H04N 1/047 358/509 |
| 2008/0094498 A1* | 4/2008 | Mori | G03B 5/02 348/352 |
| 2008/0316329 A1* | 12/2008 | Kim | H04N 5/217 348/222.1 |
| 2009/0174799 A1* | 7/2009 | Lee | H04N 5/361 348/294 |
| 2009/0180156 A1* | 7/2009 | Yoshimaru | H04N 1/12 358/474 |
| 2009/0238591 A1* | 9/2009 | Watanabe | G03G 15/5037 399/51 |

\* cited by examiner

SIGNAL INTENSITY MATCHING OF IMAGE SENSORS

CROSS REFERENCE TO RELATED APPLICATION

This application is a U.S. National Phase patent application of PCT/EP2010/064656, filed Oct. 1, 2010, which is hereby incorporated by reference in the present disclosure in its entirety.

FIELD

This invention generally relates to optical scanning of an object. More particularly the invention relates to optical scanning of large documents by a plurality of image sensors and to compensation of image data recorded by the plurality of image sensors.

BACKGROUND

Scanning of large objects, e.g. large maps or technical drawings, is conventionally performed by using a plurality of image sensors as it is a difficult and expensive task to manufacture large single image sensors. Examples of image sensors are charge coupled device (CCD) or contact image sensors (CIS). Differences between image sensors, however, create visible artefacts in the scanned images. The intensity of a scanned medium may look different dependent on which image sensor is used. This makes the scanned images less perceptually appealing. As the differences are non-static, compensation is a challenging task.

EP 2 091 223 entitled "Image reading device and image forming apparatus" discloses an optical scanner with multiple cameras that each outputs line signals. The cameras are arranged to each view a portion of a line on a document to be scanned. The cameras view the line with a certain overlap such that intensity information is recorded by two cameras in the overlapping regions of the line. A complete line on the document is reproduced by combining line signals from the cameras. The line signals are processed in the overlapping area to compensate for an intensity boundary, e.g. a visible artefact at the stitching point between cameras, which may occur. The method, however, still creates visible artefacts in the generated images.

Thus, it remains a problem to improve the image quality of large-format scanners to compensate for differences between individual image sensors.

SUMMARY

According to a first aspect, there is provided a method of processing signals from a first and a second image sensor that provide respective image signals recorded at respective areas of a scanned medium, where a portion of the respective areas is recorded also by the other of the respective image sensors, whereby image data from overlapping and non-overlapping areas are present in the respective signals; the method comprising:
  determining a first and a second level of intensity from image signals from the first and the second image sensor, respectively, at the overlapping area;
  determining a compensation value by processing the first level of intensity and the second level of intensity to determine a discrepancy between the first and second levels of intensity;
  applying compensation values to image data from non-overlapping areas to provide compensated image data to compensate for a discrepancy between levels of intensity from the first and the second image sensor.

Consequently, images with smooth transitions between the individual image sensors can be created. Thereby, artefacts in scanned images as a result of discrepancies between images sensors can be compensated for.

Compensation values may also be applied to image data from overlapping areas.

The method may be a method of processing signals from a large-format scanner comprising a first and a second image sensor. The image sensor may comprise image sensor elements arranged in an array, e.g. a linear array. The image sensor may comprise two staggered linear arrays of image sensor elements e.g. two 600 dpi arrays staggered to create a 1200 dpi image sensor. Any kind of image sensors suitable for optical scanning may be used, such as any kind of photo voltaic sensor e.g. a contact image sensor (CIS) or a charge coupled device (CCD) camera. A suitable lighting device may be arranged together with the image sensors such as a xenon-based lighting device, a cold cathode fluorescent lamp or an LED lighting device. The image sensors may comprise a plurality of different image sensor elements configured to detect light having different wave lengths; e.g. a first image sensor element may be configured to detect red light, a second image sensor element may be configured to detect green light, and a third image sensor element may be configured to detect blue light. Alternatively or additionally, the lighting devices may be configured to illuminate the physical object to be scanned with light having different wave lengths, e.g. the lighting devices may be configured to create red, green, and blue light.

The image sensors may be arranged in any fashion as long as a common area of a scanned medium is recorded by at least two image sensors. The image sensors may be arranged on a movable structure, and/or a physical medium may be moved past the image sensors so that a completely scanned image of the physical medium may be formed. The common area may be recorded by the image sensors at different points in time; e.g. the image sensors may be arranged on two parallel lines, where every other image sensor is arranged with a field of view on a first line, and the image sensors in-between are arranged with a field of view on a second line, where the distance between the field of view of two adjacent image sensors on a line is below the width of the field of view of the image sensors, such that an area of a scanned medium recorded by an image sensor on the first line is also recorded by an image sensor on the second line, at a different point in time; e.g. when the image sensors and/or the physical medium are/is moved, as described in relation to FIG. 6a.

The first and second levels of intensity are a measure of the light intensity recorded by the first and the second image sensor, respectively at the overlapping area. The level of intensity for an image sensor may be determined by processing the signal generated by the image sensor at the overlapping area when scanning a physical medium. The signal is constituted of values recorded by the image sensor elements of the image sensor in the overlapping area when scanning a physical medium. The processing may be performed in a plurality of different ways such as by taking an average of the recorded values of a scanned line at the overlapping area, selecting one value of the signal, or an average of a plurality of values of the signal.

The compensation values may be determined by using any algorithm taking the first and second levels of intensity as an input for creating a compensation value; i.e. the generated compensation value is dependent on both the first and second levels of intensity. The algorithm may generate a plurality of compensation values, e.g. a compensation value for each image sensor element of the first and the second image sensor may be generated. The compensation values may be applied to image data in any suitable manner, such as by adding the compensation value to the image data or by multiplying image data with a compensation value. The algorithm may compare the first and second levels of intensity of the first and the second image sensor to determine which is higher, and create compensation values that, when applied to the image data, increase values originating from the image sensor having the lowest level of intensity and/or lower values originating from the image sensor having the highest level of intensity. The algorithm may create compensation values that, when applied to image data, ensure that the values of the image data from both the first and the second image sensor in the overlapping region are equal, so that the image data can be stitched together without creating an intensity boundary. Additionally, the image data may be stitched together by fading in the overlapping area from image data recorded by the first image sensor to image data recorded by the second image sensor; e.g. the resulting image, after stitching, may, in the overlapping area, have image data that are created by a weighted average of the data from both the first and the second image sensor, where the weight is determined based on the position in the overlapping area so that values in the overlapping area close to the non-overlapping area of the first image sensor are dominated by the first image sensor and values close to the non-overlapping area of the second image sensor is dominated by the second image sensor.

For large-format scanners comprising more than two image sensors, it may be insufficient to determine compensation values using the method disclosed above.

In some embodiments, signals from a third image sensor are further processed, the third image sensor providing an image signal recorded at an area of a scanned medium, where a portion of the area is recorded also by the second image sensor, whereby image data from at least two overlapping and one non-overlapping area are present in the signals from the second image sensor; the method comprising:
  determining a third and a fourth level of intensity from image signals from the second and the third image sensor at the overlapping area between the second and the third image sensor;
  determining compensation values for image signals from non-overlapping areas from the second image sensor by processing the first, second, third, and fourth levels of intensity to determine a discrepancy between the first and second levels of intensity and further between the third and fourth levels of intensity;
  applying compensation values to image data from non-overlapping areas of the second image sensor to provide compensated image data to compensate for a discrepancy between levels of intensity from the first and the second image sensor and further between the second and the third image sensor.

Consequently, a method is provided that can compensate for discrepancies between image sensors for complex large-format scanners comprising more than two image sensors, securing even smoother and more perceptually appealing images.

The compensation values may be determined by using any algorithm taking the first, second, third, and fourth levels of intensity as an input for creating a compensation value; e.g. the generated compensation value is dependent on both the first, second, third, and fourth levels of intensity. The algorithm may generate a plurality of compensation values, e.g. a compensation value for each image sensor element of the second image sensor may be generated. A first compensation value may be determined by processing the first and second levels of intensity and a second compensation value may be determined by processing the third and fourth levels of intensity. Compensation values for the individual image sensor elements of the second image sensor at the non-overlapping area may be generated by an algorithm taking the first and second compensation values as an input; e.g. compensation values for the individual image sensor elements of the second image sensor at the non-overlapping area may be determined by performing an interpolation between the first and second compensation values, e.g. a linear interpolation. Compensation values may also be determined for the overlapping areas of the second image sensor, and applied to image data from overlapping and non overlapping areas of the second image sensor.

In some embodiments, the level of intensity at overlapping areas is calculated as an average of image signals from multiple image sensor elements comprised by the image sensors. The first level of intensity may be calculated as an average of the values recorded by the image sensor elements of the first image sensor at the overlapping area. Correspondingly, the second level of intensity may be calculated as an average of the values recorded by the image sensor elements of the second image sensor at the overlapping area. The average may be a weighted average.

In several situations it may be advantageous to limit the amount of compensation applied, as over-compensation may distort the generated images. For instance as mentioned below.

In some embodiments, a first target value is determined for the overlapping area between the first and the second image sensor as a value between the first and second levels of intensity; and where application of the compensation values makes the intensity level of the first and the second image sensor approach the first target value. For instance, the average of the values recorded by the first and the second image sensor is closer to the target value after application of the compensation value.

The target value may be a value approximately midways between the first and second levels of intensity.

In some embodiments, a second target value is determined for the overlapping area between the second and the third image sensor as a value between the third and fourth levels of intensity; and where application of the compensation values makes intensity level of the second and the third image sensor approach the second target value. For instance, the average of the values recorded by the second and the third image sensor is closer to the target value after application of the compensation value.

Consequently, compensation may be applied that change the recorded data only to a limited extent.

Differences between image sensors are a function of the intensity; e.g. the first image sensor may be more sensitive to low intensities than the second image sensor, but less sensitive to high intensities. As the intensity of the scanned medium in the overlapping area may differ from the intensity in the remaining parts of the image sensors, compensation artefacts may occur.

In some embodiments, image data comprise image data representing a line and where compensation values are calculated using information from a plurality of lines.

Consequently, by averaging over a number of lines, a plurality of first and second levels of intensity resulting from a plurality of different intensity levels may be used to create compensation values. Thereby compensation values may be generated that are valid for all different intensity levels. By averaging over a plurality of lines, compensation errors as a result of noise in the image data can also be minimized.

The method may use information from at least e.g. 2, 5, 10, 20, 50, 100, 200, 300, 500, or 1000 lines to calculate compensation values. The method may use information from no more than e.g. 20, 50, 100, 200, 300, 500, 1000, 2000, or 100000 lines to calculate compensation values. As mentioned previously, the differences between the image sensors are temporal variant. The image sensors are influenced by slowly changing parameters such as temperature, humidity, etc. The number of lines used to average over should be selected such that it is large enough to limit artefacts, however, small enough to react to temporal variations of the image sensors. The averaging may be implemented as a ring buffer. By inserting the values into the ring buffers, values previously stored in the ring buffer may be removed, e.g. the size of the ring buffers is constant e.g. a first in first out (FIFO) ring buffer may be used. The average may be a weighted average; e.g. new lines in the ring buffer may be weighted higher than old lines or lines having special properties may be weighted higher or lower.

In some embodiments, intensity values representing bright intensities are given a different influence on the calculation of compensation values than intensity values representing dark intensities.

In some embodiments, intensity values representing bright intensities are given a greater influence on the calculation of compensation values than intensity values representing dark intensities.

In some embodiments, the method further comprises a step where a filter filters away the first and second levels of intensity if the first and second levels of intensity are dark.

The method may replace the first and second levels of intensity with a guess. The guess may be first and second levels of intensity determined for previous lines, or an average of first and second levels of intensity determined for previous lines, e.g. for the last 50, 100, 200, 300, 500, or 1000 lines.

Bright intensities values may be intensity values having a value above 30% of the maximum value possible with the chosen number of bits used to represent intensity values e.g. if 10 bits are used, values above 307 are bright intensity values.

Bright intensities values may be intensity values having a value above e.g. 10%, 20%, 30%, 40%, 50%, 60%, 70% of the maximum value possible with the chosen number of bits used to represent intensity values.

Dark intensities values may be intensity values having a value below 30% of the maximum value possible with the chosen number of bits used to represent intensity values; e.g. if 10 bits are used, values below 307 are dark intensity values.

Dark intensities values may be intensity values having a value below e.g. 5%, 8%, 10%, 20%, 30%, 40%, 50%, 60%, 70% of the maximum value possible with the chosen number of bits used to represent intensity values.

The inventor has surprisingly discovered that by primarily using bright intensity values to calculate compensation values, a better compensation for discrepancies between image sensors can be achieved. The precise definition of dark and bright intensities depends on the type of image sensor used.

The calculated level of intensities may be used to determine if the image data in the overlapping area of an image sensor have dark and/or bright intensities, e.g. if the level of intensity is calculated as an average of the values recorded by image sensor elements at an overlapping region, an average below 307 may indicate that dark intensity values are present in the overlapping region, if dark intensities are defined as a value below 30% of the maximum value possible (when using 10 bits to represent intensity values).

When performing colour scans, each image sensor may have different sensitivity to different colours; e.g. a specific image sensor may be more sensitive to red colours than to blue colours. Therefore, discrepancies between image sensors may differ for different colours. However, by correcting for the discrepancies for each colour, new artefacts are introduced into the resulting image as the colour balance is changed.

In some embodiments, the image data comprise image data representing intensity levels at different colours and where a common compensation value is determined for the different colours.

Consequently, an efficient compensation can be applied without displacing the colour balance.

The common compensation value may be generated as an average of compensation values determined for each colour; e.g. a compensation value may be determined for each colour using the principles discussed above, and the determined compensation values for the different colours may be averaged before they are applied to image data. Thereby, common compensation values may be generated that are valid for all colours.

In some embodiments, the common compensation value may be generated as a weighted average of compensation values determined for each colour. Consequently, images with a correct colour balance may be generated that are visibly more appealing as the human eye has different sensitivity to differences for different colours.

In some embodiments, the steps are performed as data for a line become available from scanning means or where the steps are performed at a point in time after scanning of a complete set of lines is completed. For instance, the steps may be performed live e.g. at the same time as a document is being scanned, or as post-processing after a document has been scanned.

In some embodiments, compensation is applied equally for all image sensor elements for at least the first or the second image sensor to shift the intensity level at least of the non-overlapping area to be on par with a target value at the overlapping area.

In some embodiments, the method further comprises a step that checks if the signals recorded by the image sensors at the overlapping area result from the same area of a scanned medium, and if the step determines that the signals recorded by the image sensors at the overlapping area do not result from the same area of the scanned medium, it replaces the determined first and second level of intensity with a guess of the first and second levels of intensity.

The check may be performed by calculating the normalized correlation coefficient between the signals recorded by the first and the second image sensor at the overlapping area and examining if the resulting normalized correlation coefficient is above a predetermined threshold or by performing a normal cross-correlation between the two signals and checking if the maximum of the correlation function is close to lag zero, as it should be if the calibration of the scanner is precise. Alternatively to using the cross-correlation, the sum of absolute differences, or the sum of squared differences may be used. Information from all colour channels may be used to perform the check; e.g. a combined sum of absolute differences may be calculated for all colour channels. The guess may be first and second levels of intensity determined for previous lines, or an average of first and second levels of intensity determined for previous lines e.g. for the last 50, 100, 200, 300, 500, or 1000 lines.

According to a second aspect there is provided an apparatus for scanning comprising a first and a second image sensor configured to provide respective image signals recorded at respective areas of a scanned medium, where a portion of the respective areas is recorded also by the other of the respective image sensors, whereby image data from overlapping and non-overlapping areas are present in the respective signals; the optical scanner further comprising a processing unit configured to:
- determine a first and a second level of intensity from image signals from the first and the second image sensor at the overlapping area, respectively;
- determine a compensation value by processing the first level of intensity and the second level of intensity to determine a discrepancy between the first and second levels of intensity;
- apply compensation values to image data from non-overlapping areas to provide compensated image data to compensate for a discrepancy between levels of intensity from the first and the second image sensor.

All components of the apparatus may be integrated in a single integral unit, e.g. in an optical scanner, or the different parts of the apparatus may be implemented in different components; e.g. the image sensors may be implemented in a first component and the processing unit may be implemented in a second component, e.g. in a PC connected to the first component with data communication means or in a server connected to the internet communicating directly or indirectly with the first component using data communication means.

Here and in the following, the terms 'processing means' and 'processing unit' are intended to comprise any circuit and/or device suitably adapted to perform the functions described herein. In particular, the above term comprises general purpose or proprietary programmable microprocessors, Digital Signal Processors (DSP), Application Specific Integrated Circuits (ASIC), Programmable Logic Arrays (PLA), Field Programmable Gate Arrays (FPGA), special-purpose electronic circuits, etc., or a combination thereof The different aspects of the present invention can be implemented in different ways including the methods of processing signals and the apparatuses described above and in the following, each yielding one or more of the benefits and advantages described in connection with at least one of the aspects described above, and each having one or more preferred embodiments corresponding to the preferred embodiments described in connection with at least one of the aspects described above and/or disclosed in the dependent claims. Furthermore, it will be appreciated that embodiments described in connection with one of the aspects described herein may equally be applied to the other aspects.

BRIEF DESCRIPTION OF THE DRAWINGS

The above and/or additional objects, features and advantages of the present invention will be further elucidated by the following illustrative and non-limiting detailed description of embodiments of the present invention, with reference to the appended drawings, wherein:

FIG. 6b shows four image signals recorded by the image sensors in FIG. 6a.

DETAILED DESCRIPTION

In the following description, reference is made to the accompanying figures, which show, by way of illustration, how the invention may be practiced.

Figure 1:
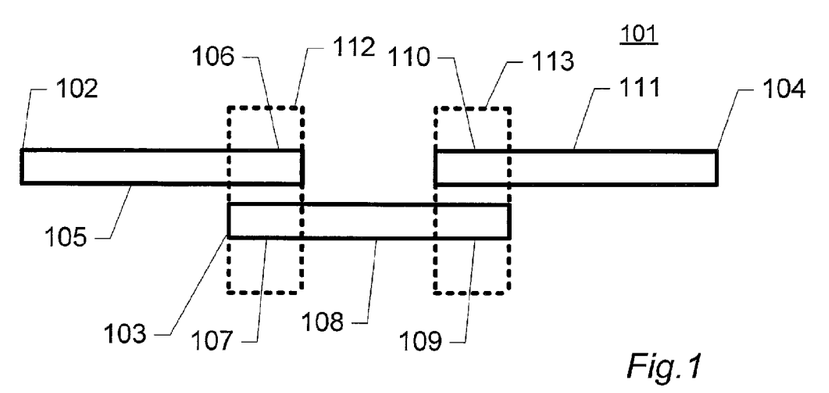
FIG. 1 shows three image sensors arranged with overlapping regions according to an embodiment of the present invention.

FIG. 1 shows three image sensors 102 103 104 arranged with overlapping regions 106 107 109 110 according to an embodiment of the present invention. The image sensors 102 103 104 may be CIS image sensors. The image sensors 102 103 104 may be arranged on a movable member, moving the image sensors past a medium to be scanned, and/or the medium may be moved past the image sensors using suitable means, e.g. motor operated rolls pulling the physical medium past the image sensors, such that a complete image of the physical medium can be generated. The image sensors 102 103 104 are arranged such that a portion of the area recorded of a scanned medium by one image sensor is also recorded by another image sensor; e.g. the region 106 of image sensor 102 records the same area as the region 107 of image sensor 103 just at another point in time; e.g. when the image sensors or the medium has been moved. Correspondingly, the region 109 of image sensor 103 records the same area as the region 110 of image sensor 104. Alternatively, if the image sensors are CCD cameras, the image sensors may be arranged on a single line recording the same area of a scanned medium at the same time.

Figure 2:
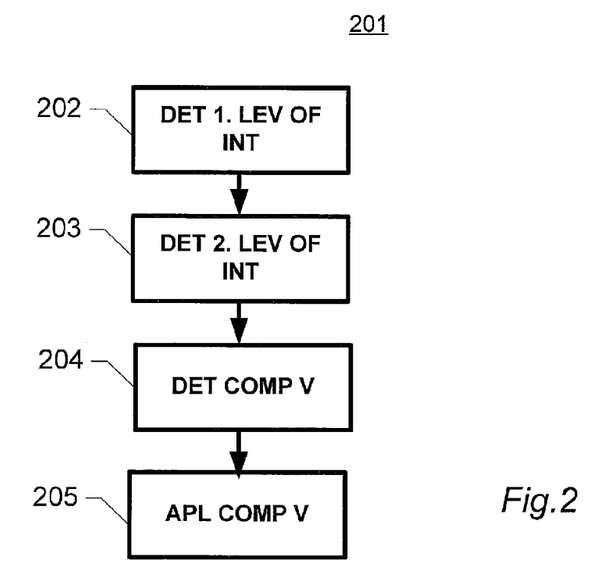
FIG. 2 shows a flowchart of a method of processing signals according to an embodiment of the present invention.

FIG. 2 shows a flowchart of a method of processing signals 201 according to an embodiment of the present invention. In the first step 202 a first level of intensity is determined for intensity values recoded by a first image sensor at an overlapping area, e.g. area 106 of image sensor 102 in FIG. 1. The first level of intensity may be calculated as an average of the intensity values recorded by the first image sensor at the overlapping area. Then, in step 203, a second level of intensity is determined for intensity values recorded by a second image sensor at an overlapping area, e.g. area 107 of image sensor 103 in FIG. 1. Correspondingly, the second level of intensity may be calculated as an average of the intensity values recorded by the second image sensor at the overlapping area. If the image sensors are arranged as shown in FIG. 1, image data from the first or the second image sensors (dependent on the direction in which the image sensors and/or a physical medium are/is moved) should be delayed, to secure that image data recorded by the first and the second image sensors at the overlapping area results from the same part of the scanned medium, e.g. if the distance between the first and the second image sensor is 1 inch and 600 lines are recorded pr.

inch, a delay of 600 lines between the first and the second image sensor should be used. In step 204 a compensation value is determined. The compensation value is determined by processing the first and second levels of intensity; e.g. the compensation value is dependent on both the first and second levels of intensity. A plurality of compensation values may be determined, e.g. one for each image sensor or even one for each image sensor element of each image sensor. Finally, in step 205, the compensation value is applied to the image data recorded by the first and the second image sensors at both overlapping and non-overlapping areas. Thereby, a discrepancy between the first and the second image sensor may be compensated for.

Figure 3A:
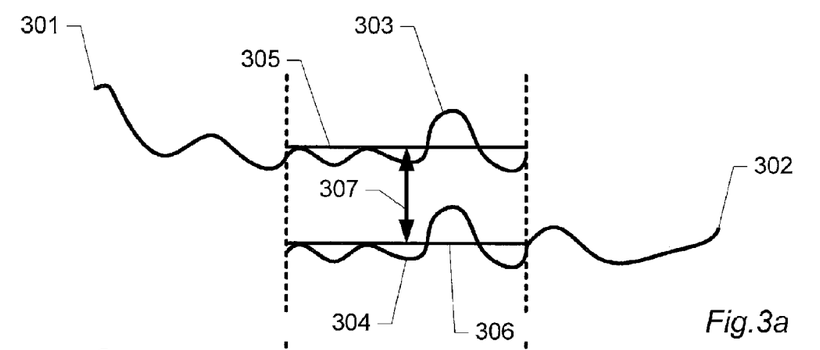
FIGS. 3a-b illustrate the problem with discrepancies between image sensors.
Figure 3B:
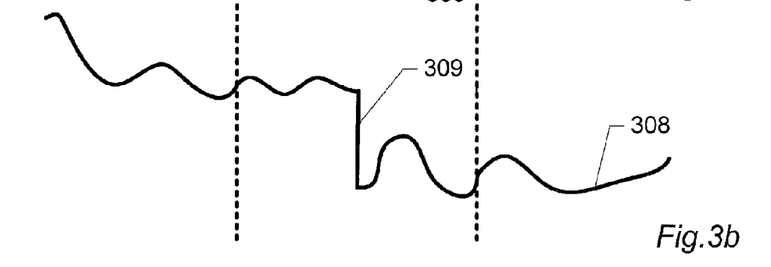

FIGS. 3a-b illustrate a problem with discrepancies between image sensors.

A first signal 301 originating from a first image sensor and a second signal 302 originating from a second image sensor are shown. The two image sensors are arranged with an overlapping area, e.g. image sensor 102 and 103 in FIG. 1, whereby overlapping image data 303 304 are present in the two signals 301 302. If the two image sensors were identical, the overlapping part 303 304 of the two signals 301 302 should be identical. However, as a result of a discrepancy between the two image sensors, the intensity values in the overlapping region of the first signal 303 are higher than the intensity values of the second signal 304 even though the morphology of the signals is the same, e.g. they have the same shape. The lines 305 show the average value of the first signal in the overlapping area. Correspondingly, the line 306 shows the average value of the image signal 302 in the overlapping area, and the arrow 307 shows the difference between 305 and 306. FIG. 3b shows the problem occurring when stitching signals together recorded by different image sensors. Because of the discrepancy between the image sensors, an intensity boundary 309 is introduced in the resulting combined signal 308. The problem may partially be solved by implementing a fade from first signal 303 to the second signal 304 in the overlapping area. This will, however, still create a visible artefact as the overlapping area is usually relatively small compared to the non-overlapping area of the image sensors.

Figure 4A:
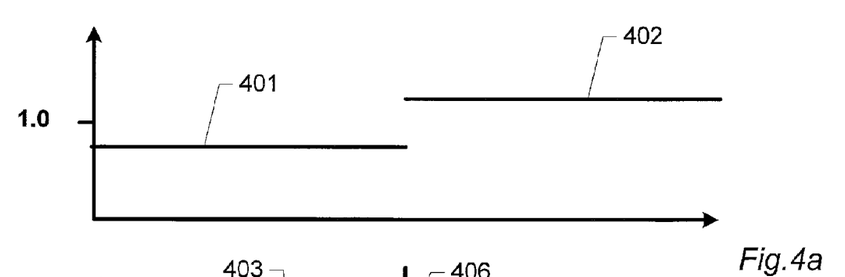
FIGS. 4a-b show how a method according to an embodiment of the present invention may be used to compensate for discrepancies between image sensors.
Figure 4B:
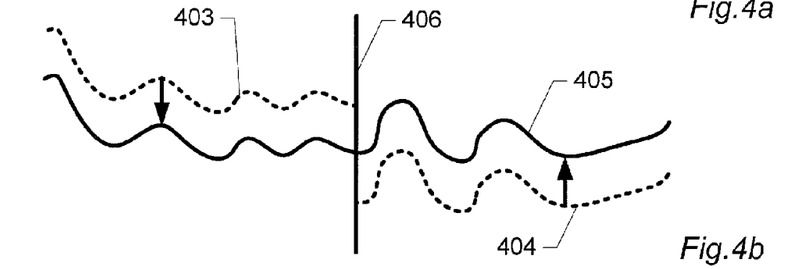

FIGS. 4a-b show how a method according to an embodiment of the present invention may be used to compensate for discrepancies between image sensors. By processing the two signals 301 302 shown in FIG. 3a, using the principles discussed in relation to FIG. 2, two compensation values 401 and 402 are created, e.g. one compensation value for image sensor 102 and one compensation value for image sensor 103 in FIG. 1. In this embodiment the same compensation value is used for all image sensor elements of an image sensor. The first compensation value 401 has a value below 1.0 and the second compensation value 402 has a value above 1.0 as the first signal 301 in FIG. 3a has higher intensity values than the second signal 302. By applying the compensation values 401 402 to the two signals 403 404, e.g. by multiplying the signal 403 with the compensation value 401 and further multiplying the signal 404 with the compensation value 402, the intensity levels of the two signals are brought at point so that they may be stitched together into the resulting signal 405, without creating an intensity boundary at the stitching point 406.

Figure 5:
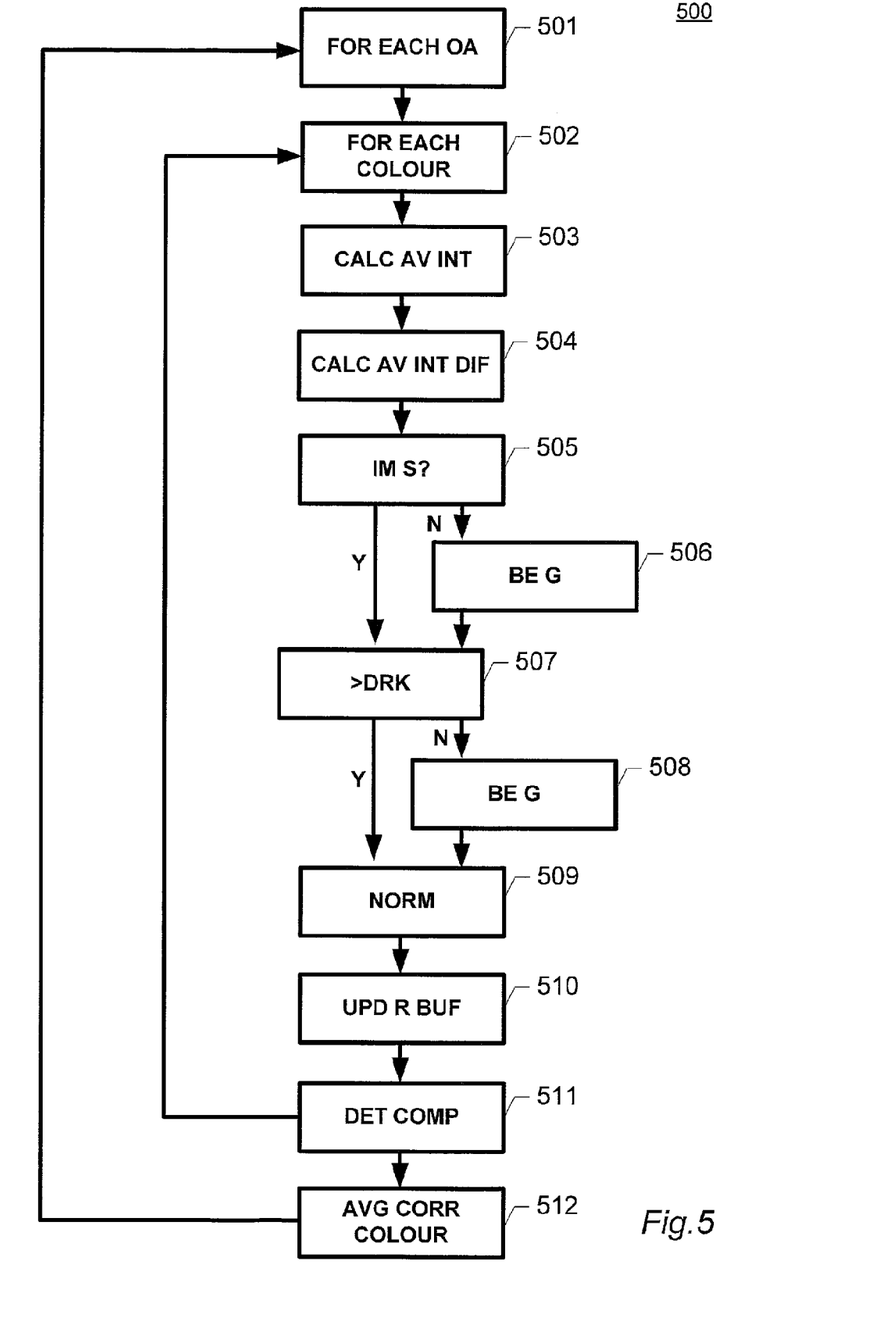
FIG. 5 shows a flowchart of a method of determining compensation values according to an embodiment of the present invention.

FIG. 5 shows a flowchart of a method of determining compensation values for a scanned line according to an embodiment of the present invention. First, a first overlapping area is chosen comprising a first and a second image sensor, in step 501 e.g. the first overlapping area 112 comprises the first image sensor 102 and the second image sensor 103 in FIG. 1. Then, a first colour channel is selected in step 502, typically, if the scan is a colour scan, three channels exist (red, green, blue), and if the scan is a black-and-white/gray scale scan one channel exists. Then, in step 503, a first and a second level of intensity are determined by calculating the average intensity for the signals recorded at the overlapping area by the first and the second image sensors, e.g. 305 and 306 in FIG. 3a, respectively. Image data from the first or the second image sensors (dependent on the direction in which the image sensors and/or a physical medium are/is moved) should be delayed to secure that image data recorded by the first and the second image sensors at the overlapping area result from the same part of a scanned medium, e.g. if the distance between the first and the second image sensor is 1 inch and 600 lines are recorded pr. inch, a delay of 600 lines between the first and the second image sensor should be used. In step 504, the difference between the first and second levels of intensity is determined. Then at step 505, a check is performed to secure that the signals recorded by the image sensors at the overlapping area result from the same area of the scanned medium. The signals may come from different parts of the scanned medium if the scanner is not adequately calibrated, e.g. if the image sensors have moved a small amount, so that the correct delay between the image sensors should have been 589 lines instead of 600 lines, or if the image sensors have moved sideways so that the overlap is in reality larger or smaller. The check may be performed by calculating the normalized correlation coefficient and checking if the resulting coefficient is above a predetermined threshold or by performing a normal cross-correlation between the two signals and checking if the maximum of the correlation function is close to lag zero, as it should be if the calibration of the scanner is precise. Alternatively to using the cross-correlation, the sum of absolute differences may be used. Information from all colour channels may be used to perform the check, e.g. a combined sum of absolute differences may be calculated for all colour channels. If the method determines that the image sensors have not examined the same area on the scanned medium, the level of intensity for the first and the second image sensor calculated in step 503 is replaced with a guess in step 506. The guess may be the average of the level of intensity for the first and the second image sensor determined for a number of previous lines, e.g. for the last 50, 100, 200, 300, 500, or 1000 lines. After step 506, or if the method in step 505 determines that the image sensors have examined the same area on the scanned medium, the method checks if the intensities in the overlapping area are too dark. The check may be performed by adding the determined first and second level of intensity together, and checking if the value is above a predetermined threshold. If the method determines that the intensities are too dark the first and second levels of intensity calculated in step 504 are replaced with a guess in step 508, in the same manner as in step 506. In contrast, if the method determines that the intensity values are not too dark, the method proceeds to step 509, where the first and second levels of intensity are normalized. The normalization may be performed by dividing the first and second levels of intensity by the combined sum of the first and second levels of intensity respectively. Then, in step 510, each of the first and second levels of intensity is inserted into a first and a second ring buffer for the chosen colour channel. The ring buffer may contain previously calculated level of intensities for the chosen colour channel, for the last 50, 100, 200, 300, 500, or 1000 lines. At step 511, a compensation value for the first and the second image sensor is determined by processing the data in the first and second ring buffer. The compensation values may be determined by firstly calculating an average first level of intensity as the average of the values in the first ring buffer, and an average second level of intensity as the average of the values in the second ring buffer. Then, the following equation may be used to give the compensation values for the first and the second image sensor:

$$COR_1 = 1 + \frac{\overline{Li_2} - \overline{Li_1}}{\overline{Li_2} + \overline{Li_1}}$$

$$COR_2 = 1 - \frac{\overline{Li_2} - \overline{Li_1}}{\overline{Li_2} + \overline{Li_1}}$$

where $\overline{Li_1}$ is the average first level of intensity, $\overline{Li_2}$ is the average second level of intensity, $COR_1$ is the first compensation value for the first image sensor, and $COR_2$ is the second compensation value for the second image sensor. The method then repeats steps 503-511 for the remaining colour channels, e.g. the remaining two colour channels for a colour scan. When all colour channels have been processed, the method, proceeds to step 512, where the calculated compensation values are averaged for all colour channels, e.g. only for a single channel when performing a black-and-white/gray scale scan, but typically for 3 channels when performing a colour scan. A combined compensation value for the first image sensor at the first overlapping area and a combined compensation value for the second image sensor at the first overlapping area are created that are valid for all colours. Steps 502-512 are then repeated for the remaining overlapping areas, e.g. for the second overlapping area 113 comprising the second image sensor 103 and the third image sensor 104 in FIG. 1.

For image sensors arranged with two overlapping areas such as image sensor 103 in FIG. 1, two compensation values are calculated. To generate compensation values for the individual image sensor elements any type of interpolation may be used between the two compensation values, e.g. a linear interpolation between the two calculated compensation values such that the compensation applied to image sensor elements close to one of the overlapping regions is dominated by the compensation value estimated at that region.

For image sensors arranged with a single overlapping areas such as image sensor 102 104 in FIG. 1, one compensation values is calculated. To generate compensation values for the individual image sensor elements, the calculated compensation value may be copied, e.g. all image sensor elements are compensated with the same compensation value.

Figure 6A:
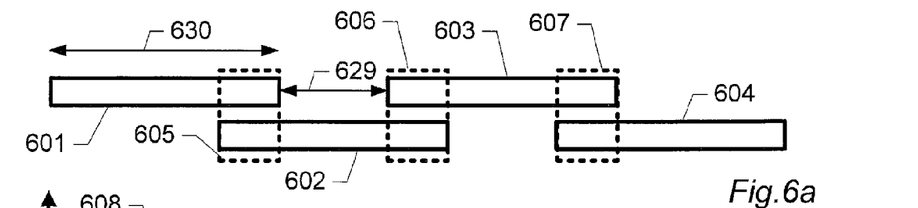
FIG. 6a shows four image sensors arranged with overlapping areas according to an embodiment of the present invention.

FIG. 6a shows four image sensors 601 602 603 604 arranged with overlapping areas 605 606 607 according to an embodiment of the present invention. The image sensors 601 602 603 604 may be CIS image sensors. The image sensors 601 602 603 604 may be arranged on a movable member, moving the image sensors past a medium to be scanned, and/or the medium may be moved past the image sensors using suitable means, e.g. motor operated rolls pulling the physical medium past the image sensors, such that a complete image of the physical medium can be generated. The image sensors are arranged on two parallel lines, where every other image sensor 601 603 is arranged with a field of view on a first line and the image sensors in-between 602 604 are arranged with a field of view on a second line, where the distance between the field of view of two adjacent image sensors on a line 629 is below the width of the field of view of the image sensors 630, such that an area of a scanned medium recorded by an image sensor on the first line is also recorded by an image sensor on the second line 605 606 607, at a different point in time; e.g. when the image sensors and/or the physical medium have/has been moved.

Figure 6B:
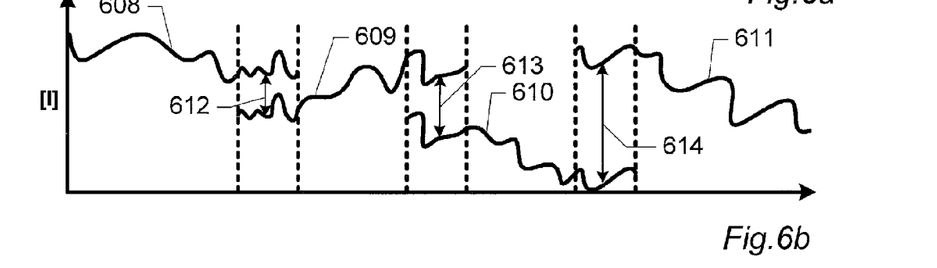

FIG. 6b shows four image signals 608 609 610 611 recorded by the image sensors in FIG. 6a. The first image signal 608 is recorded by the first image sensor 601, the second image signal 609 is recorded by the second image sensor 602, the third image signal 610 is recorded by the third image sensor 603, and the fourth image signal 611 is recorded by the fourth image sensor 604. A part of the first image signal 608 and the second image signal 609 is recorded at the overlapping area 605. The first image signal 608 has higher intensity values in the overlapping area 605 than the second image signal 609. This indicates that the first image sensor 601 generally records higher intensity values than the second image sensor 602. A part of the second image signal 609 and the third image signal 610 is recorded at the overlapping area 606. The second image signal 609 has higher intensity values in the overlapping area 606 than the third image signal 610. This indicates that the second image sensor 602 generally records higher intensity values than the third image sensor 603. A part of the third image signal 610 and the fourth image signal 611 is recorded at the overlapping area 607. The fourth image signal 611 has higher intensity values in the overlapping area 607 than the third image signal 610. This indicates that the fourth image sensor 604 generally records higher intensity values than the third image sensor 603. As it can be seen discrepancies exist between all image sensors (to varying degrees).

Figure 6C:
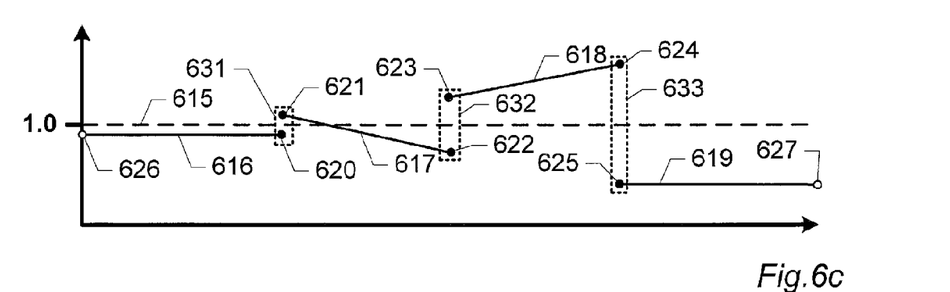
FIG. 6c shows compensation values for the four image sensors shown in FIG. 6a provided by a method according to an embodiment of the present invention.
Figure 6D:
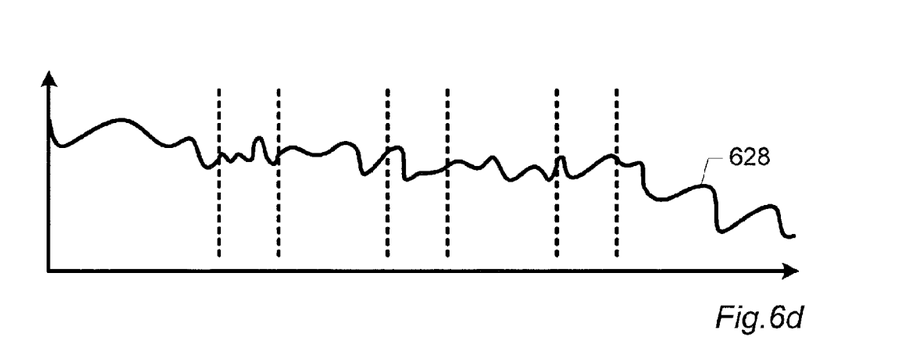
FIG. 6d shows a compensated signal generated using a method according to an embodiment of the present invention.

FIG. 6c shows compensation values 616 617 618 619 for the four image sensors 601 602 603 604 shown in FIG. 6a provided by a method according to an embodiment of the present invention. The two compensation values 620 621 are created by performing steps 502-512 discussed in relation to FIG. 5 on the part of the first image signal 608 and the second image signal 609 recorded at the overlapping area 605. Correspondingly, the two compensation values 622 623 are created by processing the part of the second image signal 609 and the third image signal 610 recorded at the overlapping area 606, and the two compensation values 624 625 are created by processing the part of the third image signal 610 and the fourth image signal 611 recorded at the overlapping area 607. For the image sensors arranged with a single overlapping area 601 604, all image sensor elements are compensated with the same compensation value, e.g. a set of compensation values 616, one for each image sensor element of image sensor 601, is created by copying the estimated compensation value 620. Correspondingly, a set of compensation values 619, one for each image sensor element of image sensor 604, is created by copying the estimated compensation value 625. For the image sensors arranged with two overlapping areas 602 603, different compensation values are created for each image sensor element, e.g. for image sensor 602 a set of compensation values 617 is created, one for each image sensor element, by performing a linear interpolation between the estimated compensation values 621 622. Correspondingly, for image sensor 603 a set of compensation values 618 is created, one for each image sensor element, by performing a linear interpolation between the estimated compensation values 623 624. By applying the compensation values to the image data; e.g. by multiplying the value recorded by each image sensor element of each image sensor, with its respective compensation value the resulting smooth signal 628 shown in FIG. 6d without any intensity boundaries at the stitching points is generated.

Figure 7:
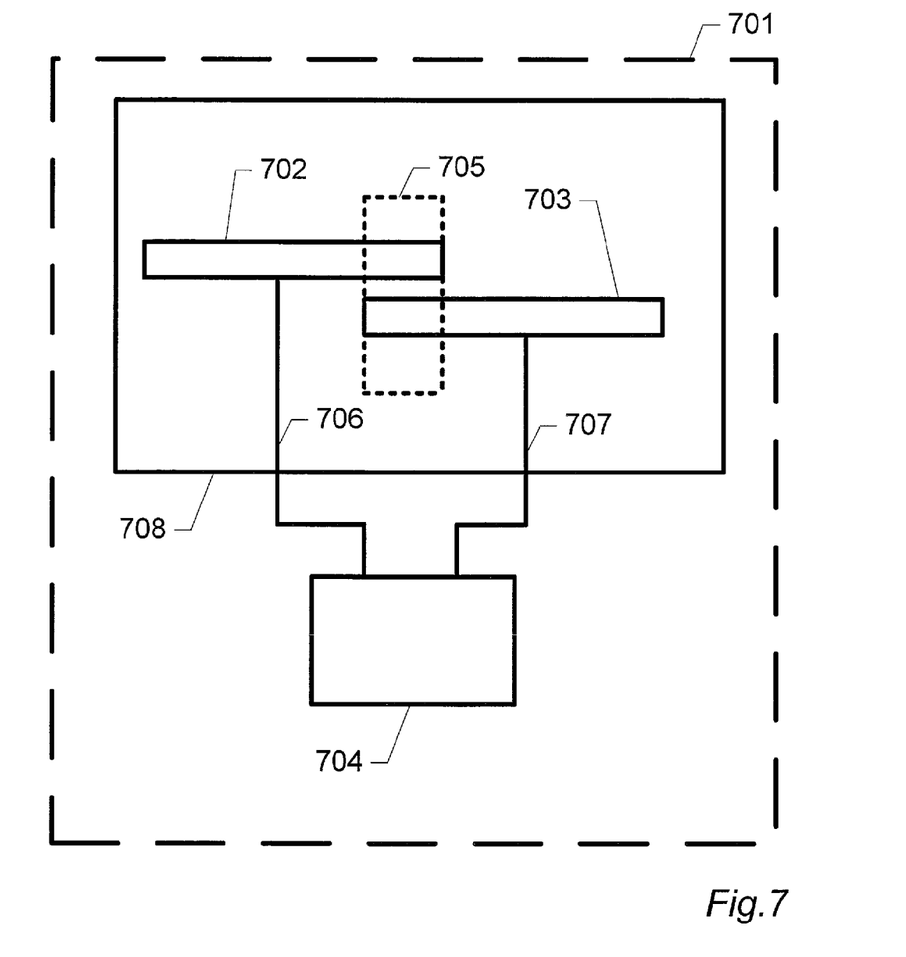
FIG. 7 shows a schematic drawing of an apparatus for scanning according to an embodiment of the present invention.

FIG. 7 shows a schematic drawing of an apparatus for scanning 701, according to an embodiment of the present invention. The apparatus comprises a first image sensor 702 and a second image sensor 703 configured to provide respective image signals recorded at respective areas of a scanned medium, where a portion of the respective areas 705 is recorded also by the other of the respective image sensors, whereby image data from overlapping and non-overlapping areas are present in the respective signals. The apparatus further comprises a processing unit 704 connected to the image sensors by data communication means 706 707. The processing unit 704 may process the signals received from the image sensors 702 703 using the principles discussed in relation to FIG. 2 and/or FIG. 5. All components of the apparatus 701 may be integrated in a single integral unit, e.g. in an optical scanner, or the different parts of the apparatus may be implemented in different components; e.g. the image sensors 702 703 may be implemented in a first component 708 and the processing unit may be implemented a second component 704 e.g. in a personal computer (PC) connected to the first component 708 with data communication means 706 707 or in a server connected to the internet communicating directly or indirectly with the first component 708 using data communication means 706 707.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components, but does not preclude the presence or addition of one or more other features, integers, steps, components or groups thereof.

The invention claimed is:

1. A method of processing signals from a first a second and a third image sensor arranged in a large format optical scanner that provide respective image signals recorded at respective areas of a scanned medium, where a portion of the respective areas is recorded by two of the respective image sensors, wherein image data from at least a first and second overlapping area and a non-overlapping area are present in a signal from the second image sensor; wherein the image sensors comprise individual image sensor elements; the method comprising:
   determining a first and a second level of intensity from image signals, at the first overlapping area, from the first and the second image sensor respectively;
   determining a third and a fourth level of intensity from image signals, at the second overlapping area, from the second and the third image sensor respectively;
   determining a first compensation value by processing the first level of intensity and the second level of intensity to determine a discrepancy between the first and second levels of intensity at the first overlapping area;
   determining a second compensation value by processing the third level of intensity and the fourth level of intensity to determine a discrepancy between the third and fourth levels of intensity at the second overlapping area;
   generating a set of compensation values for the individual image sensor elements of the second image sensor at the non-overlapping area by performing an interpolation between the first and second compensation values;
   applying the compensation values, determined from the levels of intensity of image signals at the overlapping areas, to image data from overlapping and non-overlapping areas to provide compensated image data to compensate for a discrepancy between levels of intensity from the first and the second image sensor and to compensate for a discrepancy between levels of intensity from the second and the third image sensor, wherein the above steps are performed at the same time as a document is being scanned.

2. A method according to claim 1, wherein signals from a fourth image sensor are further processed, the fourth image sensor providing an image signal recorded at an area of a scanned medium, where a portion of the area is recorded also by the third image sensor, whereby image data from at least two overlapping and one non-overlapping area are present in the signals from the third image sensor; the method comprising:
   determining a fifth and a sixth level of intensity from image signals from the third and the fourth image sensor at the overlapping area between the third and the fourth image sensor;
   determining compensation values for image signals from non-overlapping areas from the third image sensor by processing the third, fourth, fifth, and sixth levels of intensity to determine a discrepancy between the third and fourth levels of intensity and further between the fifth and sixth levels of intensity;
   applying compensation values to image data from non-overlapping areas of the third image sensor to provide compensated image data to compensate for a discrepancy between levels of intensity from the third and the fourth image sensor.

3. A method according to claim 1, where the level of intensity at overlapping areas is calculated as an average of image signals from multiple image sensor elements comprised by the image sensors.

4. A method according to claim 1, where a first target value is determined for the overlapping area between the first and the second image sensor as a value between the first and second levels of intensity; and where the compensation values are applied to make the first and second levels of intensity of the first and the second image sensor approach the first target value.

5. A method according to claim 2, where a first target value is determined for the overlapping area between the first and the second image sensor as a value between the first and second levels of intensity; and where the compensation values are applied to make the first and second levels of intensity of the first and the second image sensor approach the first target value, and
   where a second target value is determined for the overlapping area between the second and the third image sensor as a value between the third and fourth levels of intensity;
   and where the compensation values are applied to make the third and fourth levels of intensity of the second and the third image sensor approach the second target value.

6. A method according to claim 1, where image data comprise image data representing a line and where compensation values are calculated using information from a plurality of lines.

7. A method according to claim 1, where intensity values representing bright intensities are given a greater influence on the calculation of compensation values than intensity values representing dark intensities.

8. A method according to claim 1, where the image data comprise image data representing intensity levels at different colours and where a common compensation value is determined for the different colours.

9. A method according to claim 1, where the steps are performed as data for a line become available from a scanning means or where the steps are performed at a point in time after scanning of a complete set of lines is completed.

10. A method according to claim 1, where compensation is applied equally for all image sensor elements for at least the first or the second image sensor to shift the intensity level at least of the non-overlapping area to be on par with a target value at the overlapping area.

11. A method according to claim 1, where the method further comprises a step that checks if the signals recorded by the image sensors at the overlapping area result from the same area of a scanned medium, and, if the step determines that the signals recorded by the image sensors at the overlapping area do not result from the same area of the scanned medium, it replaces the determined first and second level of intensity with a guess of the first and second levels of intensity.

12. A data processing system having a non-transitory computer-readable medium having stored thereon program code means adapted to cause the data processing system to perform the steps of the method according to claim 1, when said program code means are executed on the data processing system.

13. A non-transitory computer-readable medium having stored thereon program code means adapted to cause a data processing system to perform the steps of the method according to claim 1, when said program code means are executed on the data processing system.

14. An apparatus for scanning comprising a first a second and a third image sensor arranged in a staggered configured to provide respective image signals recorded at respective areas of a scanned medium, where a portion of the respective areas is recorded also by other two of the respective image sensors, wherein image data from at least a first and second overlapping area and a non-overlapping area are present in the signals from the second image sensor; wherein the image sensors comprise individual image sensor elements; the apparatus further comprising a processing unit configured to:
- determine a first and a second level of intensity from image signals, at the first overlapping area, from the first and the second image sensor, respectively;
- determine a third and a fourth level of intensity from image signals, at the second overlapping area, from the second and the third image sensor respectively;
- determine a first compensation value by processing the first level of intensity and the second level of intensity to determine a discrepancy between the first and second levels of intensity at the first overlapping area;
- determine a second compensation value by processing the third level of intensity and the fourth level of intensity to determine a discrepancy between the third and fourth levels of intensity at the second overlapping area;
- generate a set of compensation values for the individual image sensor elements of the second image sensor at the non-overlapping area by taking the first and second compensation values as an input and performing an interpolation between the first and second compensation values;
- apply the compensation values, determined from the levels of intensity of image signals at the overlapping area areas, to image data from overlapping and non-overlapping areas to provide compensated image data to compensate for a discrepancy between levels of intensity from the first and the second image sensor and to compensate for a discrepancy between levels of intensity from the second and the third image sensor,
- wherein the processing unit is further configured to perform the above steps at the same time as a document is being scanned.

* * * * *